(12) United States Patent
Sawada et al.

(10) Patent No.: US 10,710,467 B2
(45) Date of Patent: Jul. 14, 2020

(54) INFORMATION PROVIDING SYSTEM AND METHOD, AND SERVER USED FOR INFORMATION PROVIDING SYSTEM AND METHOD

(71) Applicant: TOYOTA JIDOSHA KABUSHIKI KAISHA, Toyota-shi, Aichi-ken (JP)

(72) Inventors: Hiroki Sawada, Toyota (JP); Masato Tamaoki, Iwakura (JP); Eisuke Ando, Nagoya (JP); Masato Endo, Nagakute (JP); Kuniaki Hasegawa, Kariya (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 61 days.

(21) Appl. No.: 16/184,623

(22) Filed: Nov. 8, 2018

(65) Prior Publication Data

US 2019/0143828 A1    May 16, 2019

(30) Foreign Application Priority Data

Nov. 13, 2017   (JP) ................................. 2017-218419

(51) Int. Cl.
*B60L 53/60* (2019.01)
*G01C 21/34* (2006.01)
(Continued)

(52) U.S. Cl.
CPC ............... *B60L 53/60* (2019.02); *B60L 53/65* (2019.02); *G01C 21/3438* (2013.01);
(Continued)

(58) Field of Classification Search
None
See application file for complete search history.

(56) References Cited

U.S. PATENT DOCUMENTS 9,656,566 B2 *   5/2017   Kano .................... G06Q 10/10
2011/0193522 A1 *   8/2011   Uesugi ................... B60L 1/003
                                                                     320/109
(Continued)

FOREIGN PATENT DOCUMENTS

JP      2013-183588 A      9/2013
JP      2016-218647 A      12/2016

*Primary Examiner* — Curtis J King
(74) *Attorney, Agent, or Firm* — Hunton Andrews Kurth LLP

(57) ABSTRACT

An information providing system includes a plurality of vehicle, a charging station, and a management server. The management server is configured to communicate with the plurality of vehicles and the charging station. Each of the vehicles allows charging of a power storage device mounted therein using electric power from the charging station and performs inter-vehicle charging for charging another vehicle using electric power of the power storage device. The management server obtains a congestion degree in the charging station and a destination of a vehicle. When a charging station is installed as an annex at a destination of the vehicle, and when the congestion degree exceeds a threshold value, the management server selects a candidate vehicle capable of performing inter-vehicle charging from among other vehicles that aim at a destination identical to the destination of the vehicle, and transmits information about the selected candidate vehicle to the vehicle.

7 Claims, 10 Drawing Sheets

(51) Int. Cl.
  G06Q 10/02     (2012.01)
  B60L 53/65     (2019.01)
  H02J 7/34      (2006.01)
  H04L 29/08         (2006.01)
  H04W 4/44          (2018.01)
  G01C 21/36         (2006.01)
  H04W 4/029         (2018.01)
  H04W 4/02          (2018.01)

(52) U.S. Cl.
  CPC ......... G01C 21/3469 (2013.01); G06Q 10/02 (2013.01); H02J 7/342 (2020.01); *G01C 21/3697* (2013.01); *H04L 67/12* (2013.01); *H04L 67/18* (2013.01); *H04W 4/023* (2013.01); *H04W 4/029* (2018.02); *H04W 4/44* (2018.02)

(56) References Cited

U.S. PATENT DOCUMENTS

| | | | |
|---|---|---|---|
| 2011/0241824 A1* | 10/2011 | Uesugi | B60L 53/65 340/5.8 |
| 2013/0009599 A1* | 1/2013 | Yukizane | B60L 53/305 320/109 |
| 2014/0152254 A1* | 6/2014 | Juhasz | B60L 53/63 320/109 |
| 2014/0163877 A1* | 6/2014 | Kiyama | G01C 21/3469 701/533 |
| 2015/0045985 A1* | 2/2015 | Yenamandra | G01C 21/3679 701/1 |
| 2015/0095233 A1* | 4/2015 | Wild | G06Q 20/40 705/44 |
| 2015/0224888 A1* | 8/2015 | Wild | B60L 53/65 705/26.9 |
| 2015/0251553 A1* | 9/2015 | Kano | G08G 1/065 701/22 |
| 2015/0286965 A1* | 10/2015 | Amano | G01C 21/3469 705/5 |
| 2015/0291047 A1* | 10/2015 | Saito | B60L 11/1824 320/109 |
| 2015/0294329 A1* | 10/2015 | Saito | G06Q 30/0261 705/7.31 |
| 2015/0306969 A1* | 10/2015 | Sabripour | G06Q 30/00 320/109 |
| 2015/0321570 A1* | 11/2015 | Cun | G06Q 10/06312 705/34 |
| 2016/0334234 A1* | 11/2016 | Wild | G06Q 10/02 |
| 2017/0282736 A1* | 10/2017 | Goei | B60L 53/665 |
| 2017/0331301 A1* | 11/2017 | Huang | H02J 7/007 |
| 2018/0111492 A1* | 4/2018 | McCool | B60L 53/12 |
| 2019/0026796 A1* | 1/2019 | Dinis da Silva de Carvalho | G06Q 30/04 |
| 2019/0255963 A1* | 8/2019 | Goei | B60L 53/16 |
| 2019/0310655 A1* | 10/2019 | Voorhies | B25J 9/1664 |

* cited by examiner

POWER-RECEIVING VEHICLE

POWER-SUPPLYING VEHICLE

FIG.9

DESTINATION: AAA SHOPPING CENTER   CONGESTION (WAIT FOR TWO HOURS)   CURRENT TIME 13:00

| | POWER-SUPPLIABLE AMOUNT | AVAILABLE TIME | ELECTRIC-POWER UNIT PRICE |
|---|---|---|---|
| CANDIDATE VEHICLE 1 | 5kWh | 13:30~15:00 | ○○ YEN/kWh |
| CANDIDATE VEHICLE 2 | 1kWh | 14:00~16:00 | △△ YEN/kWh |
| CANDIDATE VEHICLE 3 | 8kWh | 13:30~17:00 | ×× YEN/kWh |
| CANDIDATE VEHICLE 4 | 0.7kWh | 15:00~16:00 | ◎◎ YEN/kWh |

INFORMATION PROVIDING SYSTEM AND METHOD, AND SERVER USED FOR INFORMATION PROVIDING SYSTEM AND METHOD

This nonprovisional application is based on Japanese Patent Application No. 2017-218419 filed on Nov. 13, 2017 with the Japan Patent Office, the entire contents of which are hereby incorporated by reference.

BACKGROUND

Field

The present disclosure relates to a system and a method for providing information to an electrically powered vehicle, and a server used for the system and the method, and more particularly to a technique for providing information about a candidate vehicle with which inter-vehicle charging can be performed.

Description of the Background Art

In recent years, as an environmentally friendly vehicle, an electrically powered vehicle (a plug-in hybrid vehicle, an electric vehicle and the like) capable of charging its power storage device with electric power from a power supply external to the vehicle has become widespread. For example, while a vehicle is being parked at a parking area at a destination such as a shopping center or a movie theater, a power storage device may be charged in a charging station installed as an annex at the destination. When congestion occurs in the charging station at the destination, the waiting time may be increased.

Japanese Patent Laying-Open No. 2016-218647 discloses a system for predicting the congestion degree in the charging station based on the expected charging rate at the time when each electrically powered vehicle travels closer to a charging spot (a charging station) and presenting the predicted congestion degree to the user of each electrically powered vehicle.

Furthermore, Japanese Patent Laying-Open No. 2013-183588 discloses a configuration including two electrically powered vehicles, in which a power storage device of one electrically powered vehicle is charged with electric power of a power storage device of the other electrically powered vehicle.

SUMMARY

Even when congestion occurs at the destination, the user of the electrically powered vehicle may desire to utilize the parking area at this destination for the sake of convenience and the like. In this case, the user may become unable to utilize the charging station while the user stays at the destination, with the result that the user may not be able to charge the electrically powered vehicle while the user stays at the destination.

In addition, among the vehicles that are staying or scheduled to stay at the same destination, there may be a vehicle that permits to supply part of the electric power stored in its power storage device to another vehicle when its power storage device stores a sufficient amount of electric power. If such a vehicle can supply its electric power to another vehicle, the power storage device of another vehicle can be charged during a stay at the destination even when the charging station cannot be utilized due to congestion.

The present disclosure has been made to solve the above-described problems. An object of the present disclosure is to allow an electrically powered vehicle to be charged at a destination even when a charging station at this destination cannot be utilized.

A server according to the present disclosure is configured to communicate with a plurality of vehicles each equipped with a power storage device and a charging station configured to supply electric power. Each of the plurality of vehicles is configured to allow charging of the power storage device using electric power from the charging station, and to perform inter-vehicle charging for charging another vehicle using electric power of the power storage device. The server is configured to (a) obtain a congestion degree in the charging station based on information from the charging station, (b) obtain a destination of each of the plurality of vehicles, (c) when the charging station is installed as an annex at a destination of a first vehicle included in the plurality of vehicles, and when the congestion degree in the charging station exceeds a threshold value, select at least one of candidate vehicles each permitting the inter-vehicle charging from among vehicles that are included in the plurality of vehicles and that aim at a destination identical to the destination of the first vehicle, and (d) transmit, to the first vehicle, information about each of the candidate vehicles selected.

According to the present disclosure, when the user sets a destination for a vehicle, a management server obtains a congestion status in the charging station installed as an annex at the destination. Then, when charging cannot be performed in the charging station during a stay at the destination (congestion degree>threshold value), the user is notified of the information about the vehicle that permits inter-vehicle charging among the vehicles aiming at the same destination. Thus, even when the charging station cannot be utilized due to congestion, it becomes possible to increase the opportunity to charge the vehicle during a stay at the destination using the electric power from another vehicle aiming at the same destination.

The first vehicle is configured to, when a user selects from among the candidate vehicles a second vehicle with which the inter-vehicle charging is desired, transmit, to the server, information for specifying the second vehicle selected. The server is configured to make pairing between the first vehicle and the second vehicle.

By the configuration as described above, when the user selects from among the candidate vehicles presented from the management server a vehicle with which inter-vehicle charging is desired, the management server makes pairing with an applicable vehicle. Accordingly, pairing with the candidate vehicle can be implemented by a simple operation.

The server is configured to, when pairing between the first vehicle and the second vehicle completes, transmit reservation request information for securing a charging execution location for the inter-vehicle charging to the charging station. The charging station is configured to secure the charging execution location in accordance with the reservation request information.

The server is configured to, when pairing between the first vehicle and the second vehicle completes, determine a charging execution location for the inter-vehicle charging based on location information about each of the first vehicle and the second vehicle, and transmit location information about the charging execution location to the first vehicle and the second vehicle.

By the configuration as described above, when pairing completes, a parking space for performing inter-vehicle charging is secured at the destination. Accordingly, inter-vehicle charging can be started in a short waiting time when the vehicle arrives at the destination.

The information about each of the candidate vehicles includes at least one of a power-suppliable amount, an available time, and an electric-power unit price about each of the candidate vehicles.

By the configuration as described above, when the user selects a vehicle with which inter-vehicle charging is desired from among the candidate vehicles, the user's desired vehicle can be selected.

An information providing system according to another aspect of the present disclosure includes: a plurality of vehicles each equipped with a power storage device; a charging station configured to supply electric power; and a server. The server is configured to communicate with the plurality of vehicles and the charging station. Each of the plurality of vehicles is configured to allow charging of the power storage device using electric power from the charging station, and to perform inter-vehicle charging for charging another vehicle using electric power of the power storage device. The server is configured to (a) obtain a congestion degree in the charging station based on information from the charging station, (b) obtain a destination of each of the plurality of vehicles, (c) when the charging station is installed as an annex at a destination of a first vehicle included in the plurality of vehicles, and when the congestion degree in the charging station exceeds a threshold value, select at least one of candidate vehicles each permitting the inter-vehicle charging from among vehicles that are included in the plurality of vehicles and that aim at a destination identical to the destination of the first vehicle, and (d) transmit, to the first vehicle, information about each of the candidate vehicles selected. The first vehicle is configured to display, to a user, information about each of the candidate vehicles from the server.

A method according to still another aspect of the present disclosure is a method of providing information to a vehicle equipped with a power storage device. The vehicle is configured to communicate with a charging station configured to supply electric power and a server. The vehicle is configured to allow charging of the power storage device using electric power from the charging station, and to perform inter-vehicle charging for charging another vehicle using electric power of the power storage device. The method includes (a) obtaining, by the server, a congestion degree in the charging station based on information from the charging station; (b) obtaining, by the server, a destination of the vehicle; (c) when the charging station is installed as an annex at the destination of the vehicle, and when the congestion degree in the charging station exceeds a threshold value, selecting, by the server, a candidate vehicle permitting the inter-vehicle charging from among other vehicles that aim at a destination identical to the destination of the vehicle; (d) transmitting, from the server to the vehicle, information about the candidate vehicle selected; and (e) displaying, in the vehicle, information about the candidate vehicle.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 9 is a diagram showing an example of information displayed in the electrically powered vehicle.

DESCRIPTION OF THE PREFERRED EMBODIMENTS

Figure 1:
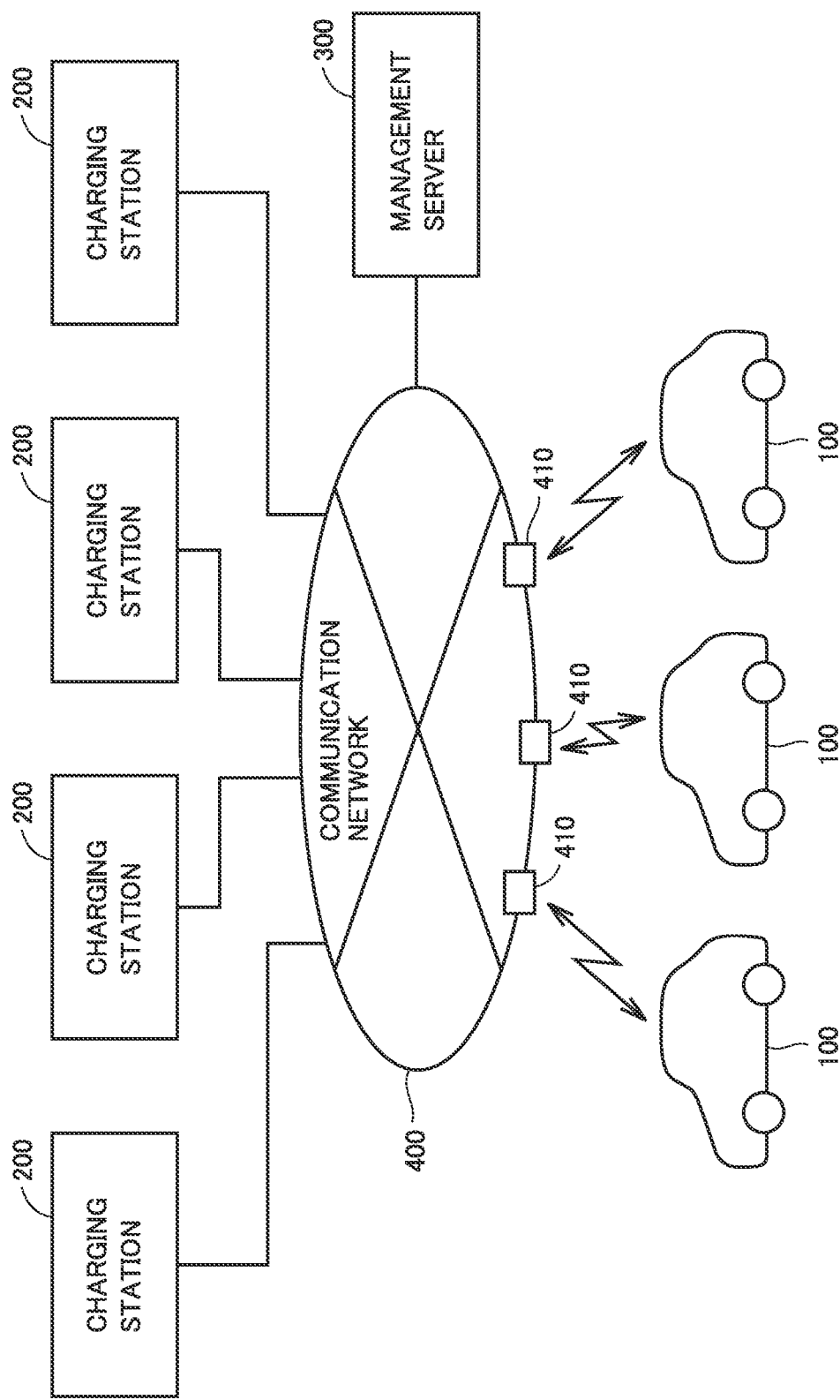
FIG. 1 is a diagram schematically showing the entire configuration of an information providing system according to the present embodiment.

Embodiments of the present disclosure will be hereinafter described in detail with reference to the accompanying drawings, in which the same or corresponding components are designated by the same reference characters, and the description thereof will not be repeated.

First Embodiment

<System Configuration>

FIG. 1 is a diagram schematically showing the entire configuration of an information providing system 10 according to the present embodiment. Referring to FIG. 1, information providing system 10 includes a plurality of electrically powered vehicles (which will be hereinafter also simply referred to as a "vehicle") 100, a plurality of charging stations 200, and a management server 300. Vehicle 100, charging station 200, and management server 300 are configured to communicate with one another through a communication network 400 such as the Internet or a telephone network. It should be noted that each vehicle 100 is configured to send and receive information to and from a base station 410 of communication network 400 through wireless communication.

As described below with reference to FIG. 2, vehicle 100 is a vehicle configured to generate driving force for traveling using electric power from a power storage device mounted thereon and to allow charging of the power storage device using electric power supplied from a power supply external to the vehicle. Vehicle 100 is an electric vehicle, a plug-in hybrid vehicle, and the like, for example.

Charging station 200 serves as a power-supplying facility for supplying electric power to vehicle 100. Charging station 200 is installed as an annex in a parking area and the like of a shopping center and the like, for example.

Management server 300 communicates with vehicle 100 and charging station 200 to provide vehicle 100 with information about each of charging station 200 and other vehicles.

Figure 2:
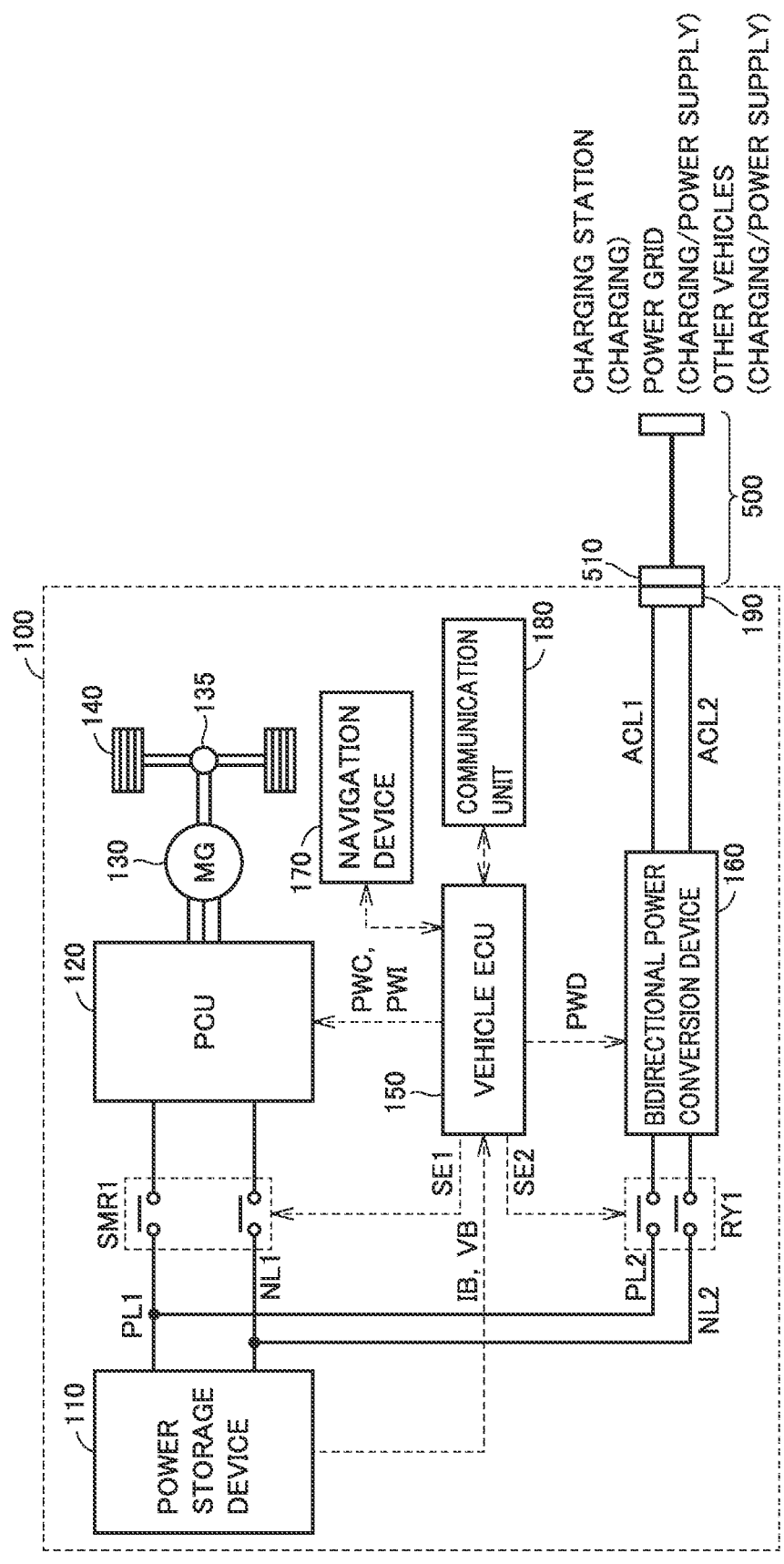
FIG. 2 is a diagram for illustrating the configuration of an electrically powered vehicle in FIG. 1.

FIG. 2 is a diagram for illustrating the configuration of vehicle 100. Referring to FIG. 2, vehicle 100 includes a power storage device 110, a system main relay (SMR) 1, a power control unit (PCU) 120 serving as a driving device, a motor generator 130, a power transmitting gear 135, driving wheels 140, a vehicle ECU (Electronic Control Unit) 150, and a navigation device 170.

In vehicle 100, power storage device 110 can be charged using electric power supplied from charging station 200 or electric power supplied from commercial power grid through a household receptacle. Moreover, vehicle 100 can output power of power storage device 110 to outside the vehicle, and can perform inter-vehicle charging, by which charging and discharging are performed between vehicle 100 and another vehicle.

Figure 3:
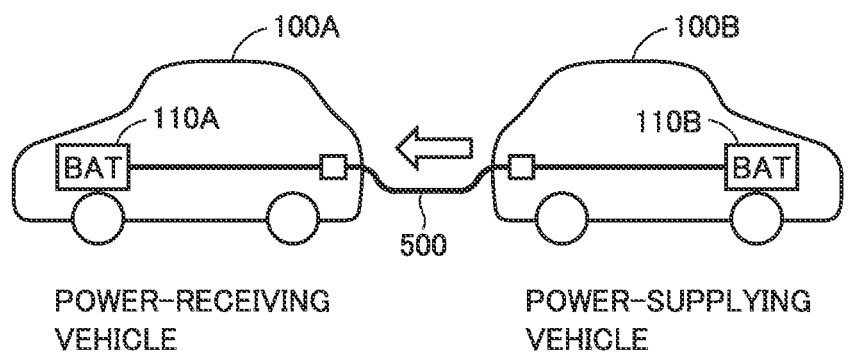
FIG. 3 is a diagram for illustrating inter-vehicle charging.

For performing inter-vehicle charging, as shown in FIG. 3, a power-receiving vehicle 100A and a power-supplying vehicle 100B are connected to each other via a charging cable 500. Then, power is discharged from a power storage device 110B mounted in power-supplying vehicle 100B to charge a power storage device 110A mounted in power-receiving vehicle 100A.

Referring back to FIG. 2, power storage device 110 is a power storage component configured to be chargeable and dischargeable. Power storage device 110 is configured to include a secondary battery such as a lithium ion battery or a nickel-metal hydride battery, or include a power storage element such as an electric double layer capacitor, for example.

Power storage device 110 is connected through system main relay SMR1 to PCU 120 for driving motor generator 130. Power storage device 110 supplies electric power to PCU 120 so as to generate driving force for vehicle 100. Further, power storage device 110 stores electric power generated by motor generator 130. Power storage device 110 outputs, to vehicle ECU 150, detection values of a voltage VB and a current IB of power storage device 110 that are detected by a sensor not shown in the figure.

System main relay SMR1 includes: a relay connected between the positive terminal of power storage device 110 and a power line PL1 of PCU 120; and a relay connected between the negative terminal of power storage device 110 and a power line NL1. Based on a control signal SE1 from vehicle ECU 150, system main relay SMR1 switches supply and cut-off of the electric power between power storage device 110 and PCU 120.

PCU 120 is configured to include power conversion devices such as a converter and an inverter, which are not shown in the figure. The converter and the inverter are controlled by control signals PWC and PWI, respectively, from vehicle ECU 150 to convert direct-current (DC) power from power storage device 110 into alternating-current (AC) power for driving motor generator 130.

Motor generator 130 is an AC rotating electrical machine, such as a permanent-magnet type synchronous motor including a rotor having a permanent magnet embedded therein, for example. Output torque from motor generator 130 is transmitted to driving wheels 140 through power transmitting gear 135 formed of a reduction gear and a power split device to cause vehicle 100 to travel. Motor generator 130 is capable of generating electric power using rotation power of driving wheels 140 during the regenerative braking operation of vehicle 100. The generated electric power is converted by PCU 120 into charging power for power storage device 110.

Furthermore, in a hybrid vehicle equipped with an engine (not shown) in addition to motor generator 130, the engine and motor generator 130 are cooperatively operated to thereby generate required vehicle driving force. In this case, power storage device 110 can also be charged using the electric power generated by rotation of the engine.

Although not shown in FIG. 2, vehicle ECU 150 includes a CPU (Central Processing Unit), a storage device, and an input/output buffer, so as to receive signals from sensors, send control signals to devices, and control vehicle 100 and the devices. It should be noted that these components can be controlled not only by processing performed by software but also by processing performed by dedicated hardware (electronic circuit) constructed therefor.

Vehicle ECU 150 outputs a control signal for controlling PCU 120, system main relay SMR1 and the like. Furthermore, from power storage device 110, vehicle ECU 150 receives voltage VB and current IB of power storage device 110. Then, based on these pieces of information, vehicle ECU 150 calculates the state of charge (which will be hereinafter also referred to as an SOC) of power storage device 110.

As a configuration for charging and discharging power storage device 110, vehicle 100 further includes a communication unit 180, a bidirectional power conversion device 160, an inlet 190, and a charging relay RY1. A charging connector 510 of charging cable 500 is connected to inlet 190. Via charging cable 500, power supplied from charging station 200 is transferred to vehicle 100.

Bidirectional power conversion device 160 is connected to power storage device 110 by power lines PL2 and NL2 through charging relay RY1. Charging relay RY1 is controlled by a control signal SE2 from vehicle ECU 150 to switch supply and cut-off of the electric power between power storage device 110 and bidirectional power conversion device 160. Furthermore, bidirectional power conversion device 160 is connected to inlet 190 by power lines ACL1 and ACL2. Bidirectional power conversion device 160 is controlled by a control signal PWD from vehicle ECU 150 to convert the AC power supplied from charging station 200 and the like into DC power with which power storage device 110 can be charged. Bidirectional power conversion device 160 is also configured to convert the DC power from power storage device 110 into AC power, and output the converted AC power to the outside of the vehicle.

Communication unit 180 is a communication interface for transmission and reception of information between vehicle ECU 150 and charging station 200. As described above, communication unit 180 is configured to communicate also with management server 300 via communication network 400.

Figure 4:
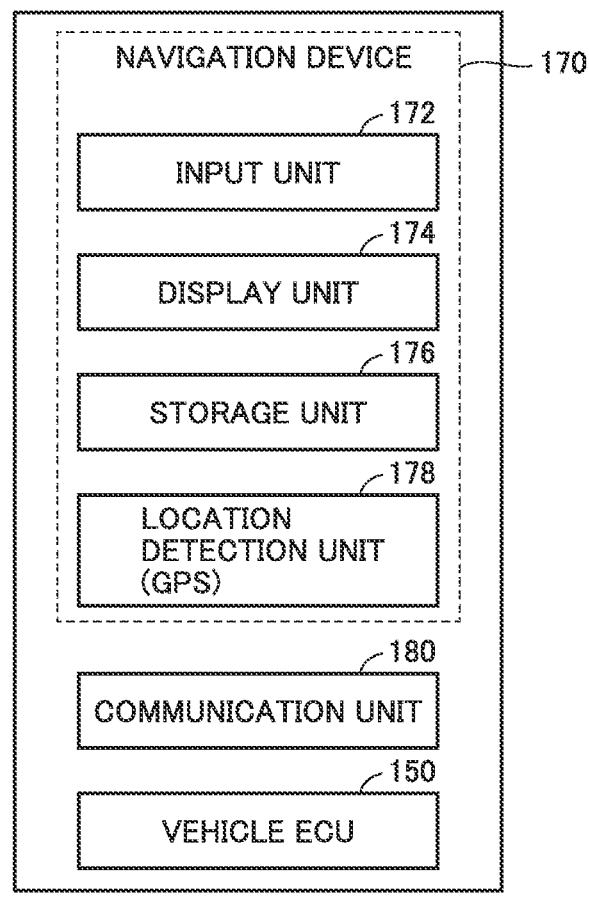
FIG. 4 is a diagram showing the configuration of a navigation device in the electrically powered vehicle in FIG. 2.

Navigation device 170 includes an input unit 172, a display unit 174, a storage unit 176, and a location detection unit 178 as shown in FIG. 4. Navigation device 170 uses the map information stored in storage unit 176 and the location information of vehicle 100 detected by a GPS (Global Positioning System) of location detection unit 178, so as to provide a user with the current location of vehicle 100 on a map and with a guide to a destination.

Display unit 174 is constructed of, for example, a liquid crystal panel and presents the current location of vehicle 100 or various pieces of information from vehicle ECU 150.

Input unit 172 is constructed of a touch panel, a switch, or the like, and receives an operation by the user.

Figure 5:
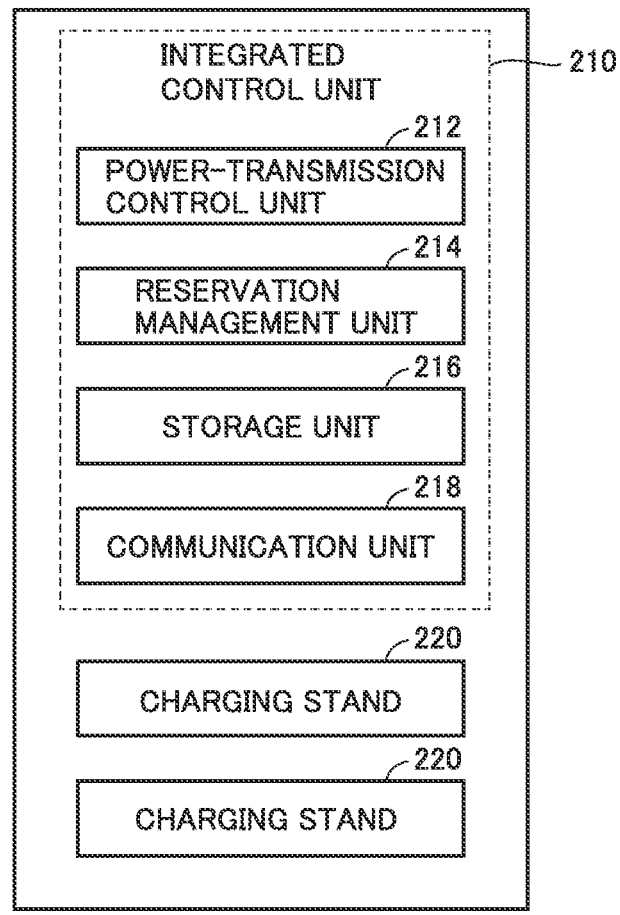
FIG. 5 is a block diagram showing the configuration of a charging station.

FIG. 5 is a block diagram showing the configuration of charging station 200. Referring to FIG. 5, charging station 200 includes an integrated control unit 210 and a plurality of charging stands 220.

Vehicle 100 can be connected to each of charging stands 220 using charging cable 500 (FIG. 2). Charging stand 220 supplies the electric power received from an external power supply (not shown) to vehicle 100.

Integrated control unit 210 serves as a controller for integrally controlling a plurality of charging stands 220. Integrated control unit 210 includes a power-transmission control unit 212, a reservation management unit 214, a storage unit 216, and a communication unit 218.

Based on the reservation request information received from vehicle 100 through management server 300, reservation management unit 214 arranges a charging schedule, and stores the arranged charging schedule in storage unit 216.

Power-transmission control unit 212 is configured to control the operation of power transmission in charging stand 220. Specifically, power-transmission control unit 212 reads the charging schedule arranged by reservation management unit 214 from storage unit 216, and instructs each charging stand to execute and stop the actual power-transmitting operation.

Communication unit 218 serves as a communication interface for transmitting and receiving information between management server 300 and vehicle 100 through communication network 400. Alternatively and/or additionally, communication unit 218 can also directly communicate with vehicle 100.

Figure 6:
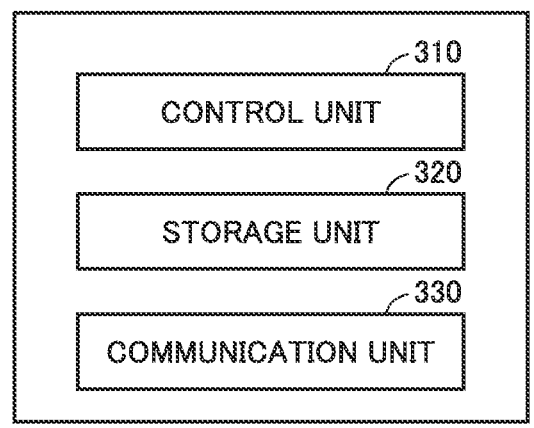
FIG. 6 is a block diagram showing the configuration of a management server.

FIG. 6 is a block diagram showing the configuration of management server 300. Referring to FIG. 6, management server 300 includes a control unit 310, a storage unit 320, and a communication unit 330.

Communication unit 330 serves as a communication interface for transmitting and receiving information between vehicle 100 and charging station 200 through communication network 400. Control unit 310 collects information such as utilization status and the like from charging station 200 through communication unit 330. Then, control unit 310 edits the collected information and transmits the edited information to vehicle 100. Furthermore, based on the information from vehicle 100, control unit 310 collects information about inter-vehicle charging and transmits the collected information to vehicle 100, or performs a process of making pairing between vehicles between which inter-vehicle charging is performed, as will be described later.

In storage unit 320, the map information and the basic information about each charging station 200 (the location information, the number of charging stands and the like) are registered. Based on the information stored in storage unit 320, control unit 310 selects charging station 200 for which information is to be collected.

<Explanation about Provision of Information on Inter-Vehicle Charging>

For example, a lot of visitors are concentrated in a shopping center, a movie theater, a theme park or the like on a holiday. Since congestion occurs in the parking area of each of these facilities, it may become difficult to perform charging in the charging station installed as an annex in the parking area of each of these facilities.

In the cases where congestion occurs in the charging station installed as an annex at a destination, even when the user desires to charge the user's vehicle during a stay at the destination, there may be cases where the user has to wait for a long time until a charging station becomes vacant, or where the user has to park the user's vehicle in a parking space where charging cannot be performed. Consequently, the duration of staying at the destination may be reduced, or the charging amount required for going home cannot be sufficiently secured.

Meanwhile, among the vehicles that are staying or scheduled to stay at the same destination, there may be a vehicle that permits inter-vehicle charging for providing part of the electric power stored in its power storage device to other vehicles when a sufficient amount of electric power is stored in this power storage device. For example, for the user who resides in the area where an electric-power unit price is inexpensive, it may become beneficial to supply the electric power stored in its power storage device to other vehicles at an electric-power unit price higher than the price at which the user has received the electric power for charging the user's vehicle.

In this way, when the vehicle requiring to be charged and the vehicle desiring to supply electric power can be matched with each other at the same destination, the vehicle requiring to be charged can be charged during a stay at the destination even if the charging station at the destination cannot be utilized due to congestion.

Thus, in the present first embodiment, an information providing system is employed that provides a user with information about a vehicle permitting inter-vehicle charging from among vehicles that are staying or scheduled to stay at the same destination when it is difficult due to congestion to utilize a charging station installed as an annex at the destination designated by the user. By employing such a system, even when the charging station at the destination cannot be utilized, the opportunity to charge the vehicle can be ensured during a stay at the destination.

It is to be noted that the "charging station installed as an annex at the destination" described in the present specification means a charging station installed in the vicinity of the destination. In other words, the charging station does not necessarily have to be installed in the same site as the destination, and not necessarily have to be managed by the same manager.

In the following, the details of control of the information providing system in the present embodiment will be described.

Figure 7:
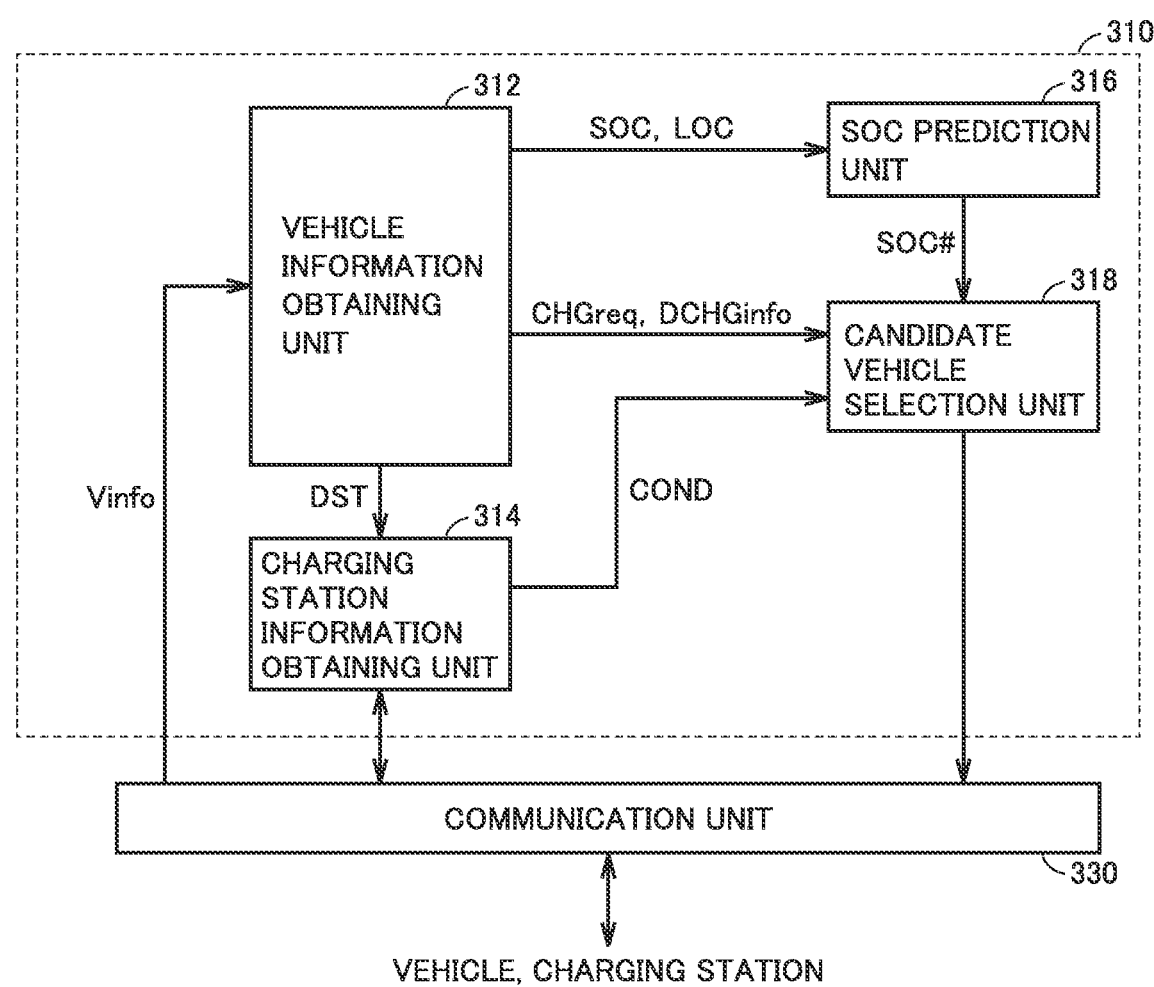
FIG. 7 is a block diagram showing the configuration of a control unit in the management server in FIG. 6.

FIG. 7 is a block diagram showing the details of control unit 310 in management server 300 in FIG. 6. Referring to FIG. 7, control unit 310 includes a vehicle information obtaining unit 312, a charging station information obtaining unit 314, an SOC prediction unit 316, and a candidate vehicle selection unit 318.

Vehicle information obtaining unit 312 obtains vehicle information Vinfo from vehicle 100 through communication unit 330. Vehicle information Vinfo includes, for example, a current location LOC of vehicle 100, a current state of charge SOC, a destination DST, charging request information CHGreq at the destination, expected arrival time at the destination, and the like. Furthermore, from the vehicle that permits inter-vehicle charging, power-supplying information DCHGinfo including information about chargeable power amount, an electric-power unit price for inter-vehicle charging, and the like is obtained.

Based on the information about destination DST of vehicle 100 obtained in vehicle information obtaining unit 312, charging station information obtaining unit 314 obtains, through communication unit 330, the information about charging station 200 installed as an annex at the destination. The information about charging station 200 includes the current status of use, the near future reservation status, the waiting time until charging station 200 becomes available, and the like. Based on these pieces of information, charging station information obtaining unit 314 generates congestion information COND showing the congestion status in charging station 200 and outputs the generated congestion information COND to candidate vehicle selection unit 318.

Based on the information about current location LOC and state of charge SOC of vehicle 100 that are included in vehicle information Vinfo, the map information stored in storage unit 320, the road congestion information, and the like, SOC prediction unit 316 calculates a predicted value SOC# of the SOC at the time when vehicle 100 arrives at the destination. SOC prediction unit 316 outputs the calculated predicted value SOC# to candidate vehicle selection unit 318.

Candidate vehicle selection unit 318 receives predicted value SOC# from SOC prediction unit 316, a charging request CHGreq and power-supplying information DCHGinfo from vehicle information obtaining unit 312, and congestion information COND about charging station 200 from charging station information obtaining unit 314. Based on these pieces of information, candidate vehicle selection unit 318 determines about the congestion degree in charging station 200 at the time when vehicle 100 arrives at the destination and also determines whether charging station 200 can be utilized or not in consideration of congestion. In the present specification, the term "congestion degree" is intended to include not only the current congestion state but also further expected congestion. The congestion degree indicates a predicted utilization ratio from the present time to several hours after, or the waiting time until charging is started, for example. Also, when the charging station cannot be utilized due to congestion, candidate vehicle selection unit 318 selects a candidate vehicle for inter-vehicle charging from among the vehicles that are staying or scheduled to stay at the destination. Candidate vehicle selection unit 318 transmits the information about the selected candidate vehicle to vehicle 100 through communication unit 330.

Figure 8:
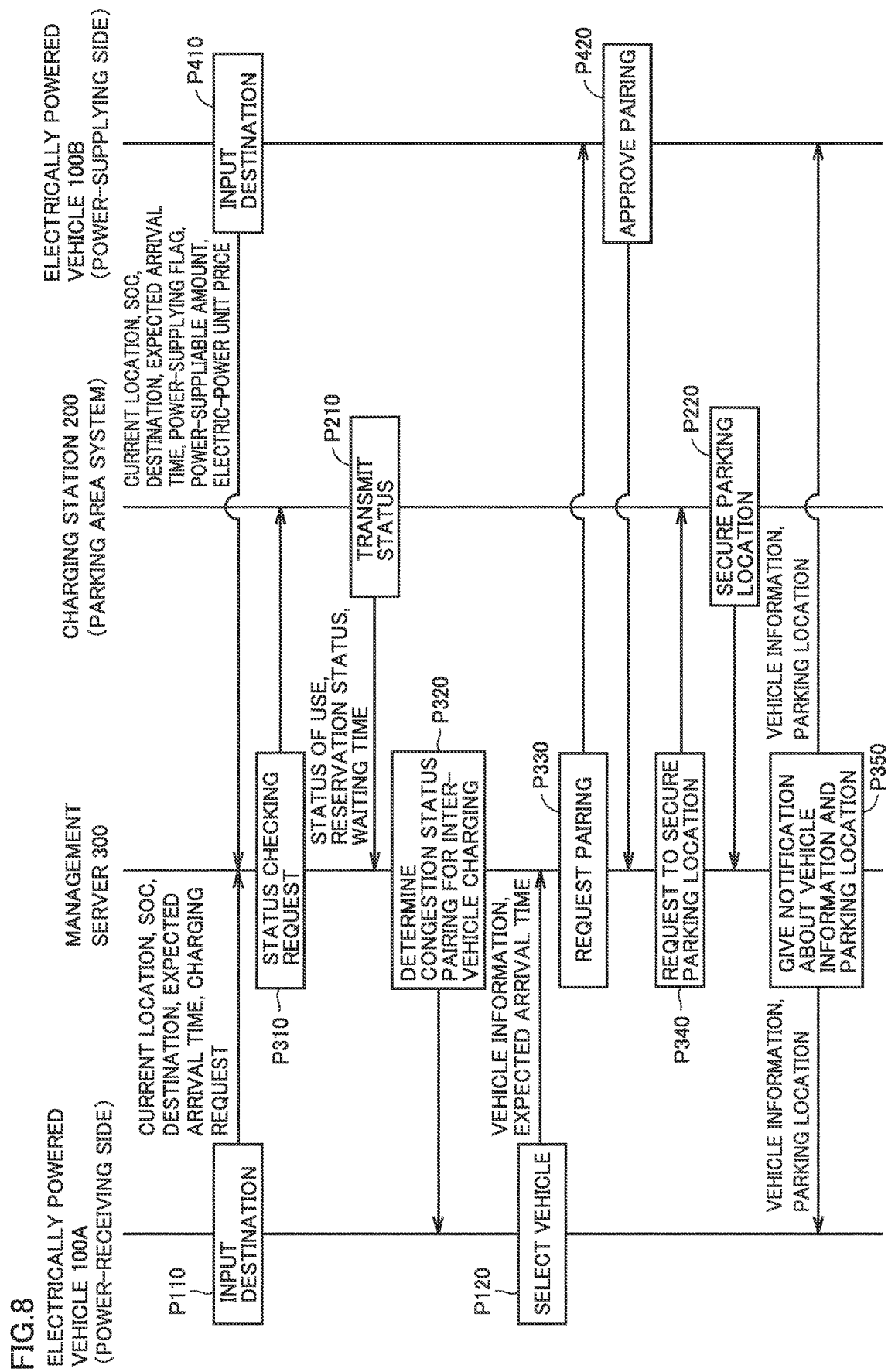
FIG. 8 is a sequence diagram showing a process performed in each element in the information providing system according to the first embodiment.

FIG. 8 is a sequence diagram showing a process performed in each element (power-receiving vehicle 100A, management server 300, charging station 200, and power-supplying vehicle 100B) in information providing system 10 according to the first embodiment.

Referring to FIG. 8, in vehicle 100A (power-receiving vehicle) that is scheduled to be charged at the destination, when the user provide inputs to navigation device 170 about the destination and the user's desire to charge vehicle 100A at the destination (P110), vehicle 100 transmits, to management server 300, the destination information including: the current location of vehicle 100; the SOC; the destination; the expected arrival time at the destination; and the charging request.

Furthermore, also in vehicle 100B (power-supplying vehicle), the destination information is transmitted to management server 300 according to the destination input by the user (P410), as in vehicle 100A. Vehicle 100B does not desire charging at the destination but permits inter-vehicle charging in contrast. Accordingly, in place of the information about the charging request included in the destination information, the information about a power-supplying flag, a power-suppliable amount and an electric-power unit price is transmitted to management server 300.

When management server 300 receives the destination information from vehicle 100A, management server 300 makes an inquiry to charging station 200 installed as an annex at the destination about the current predicted utilization status and the near future predicted utilization status (P310). Charging station 200 having received the inquiry from management server 300 sends, to management server 300, a reply of the information about the current utilization status, the reservation status and the waiting time (P210).

When management server 300 receives the information showing the utilization status and the like from charging station 200, management server 300 determines the congestion degree in charging station 200 based on these pieces of information. Then, when it is determined that the congestion degree in charging station 200 is greater than a prescribed threshold value, management server 300 selects a candidate vehicle such as vehicle 100B with which inter-vehicle charging can be performed at the destination. Management server 300 transmits, to vehicle 100A, the information showing the congestion status in charging station 200 and the information about the candidate vehicle for inter-vehicle charging (P320). In this case, the threshold value of the congestion degree is set at a value at which charging can be performed in charging station 200 in a relatively short waiting time.

When vehicle 100A receives, from management server 300, the information showing the congestion status in charging station 200 and the information about the candidate vehicle for inter-vehicle charging, vehicle 100A displays the information on a display unit 174 of navigation device 170. FIG. 9 shows an example of a display of navigation device 170 in vehicle 100. As shown in FIG. 9, navigation device 170 displays the congestion status (waiting time) at the destination, and the power-suppliable amount, the available time and the electric-power unit price for each candidate vehicle. By displaying such information about each candidate vehicle, the user's desired vehicle can be selected. In addition, the electric-power unit price for each candidate vehicle may be set at different values for each vehicle in accordance with the user's desire, or may be set at a prescribed defined value. Also in each case, the unit price may be changed in accordance with the area and the time zone.

Again referring to FIG. 8, in vehicle 100A, the user can select a vehicle, with which inter-vehicle charging is desired, from among the displayed candidate vehicles as required. When a vehicle is selected, vehicle 100A transmits, to management server 300, the information about vehicle 100A and the expected arrival time at the destination together with the information for specifying the selected vehicle (P120).

When management server 300 receives the information from vehicle 100A, management server 300 performs a process of making pairing with the selected candidate vehicle (vehicle 100B). Specifically, management server 300 notifies vehicle 100B that this vehicle 100B has been selected as a candidate for inter-vehicle charging, and transmits the information for checking whether to approve inter-vehicle charging with vehicle 100A or not (pairing request information) (P330).

When vehicle 100B receives the pairing request information from management server 300, vehicle 100B makes an inquiry to the user whether to approve inter-vehicle charging with vehicle 100A or not. As a method of making an inquiry, the inquiry may be displayed on the navigation device mounted in vehicle 100B in the case where the user is in the vehicle, or the inquiry may be sent to the user's mobile terminal such as a smartphone in the case where the user is out of the vehicle. When pairing is approved by the user of vehicle 100B, the pairing approval information is transmitted from vehicle 100B to management server 300 (P420).

When inter-vehicle charging is approved by the user of vehicle 100B, the request information for securing the parking location for performing inter-vehicle charging is transmitted to charging station 200 (parking area) (P340). This is because two vehicles need to be located adjacent to each other when inter-vehicle charging is performed. In addition, the parking location for performing inter-vehicle charging may be a parking space in which a charging stand is not installed.

When charging station 200 receives the request information from management server 300, charging station 200 secures the parking location for performing inter-vehicle charging. For securing a parking location, the procedure for prohibiting other vehicles from entering a prescribed parking space may be automatically performed, or an instruction to secure a parking location may be output to a manager of the parking area. When the parking location has been secured, charging station 200 transmits, to management server 300, the information showing that the parking location has been secured (P220).

When the parking location for performing inter-vehicle charging is secured, management server 300 notifies both vehicles about each other's detailed vehicle information and the information about the specific place of the secured parking location (P350).

When the congestion degree in charging station 200 is low so that charging station 200 can be utilized, the information about the candidate vehicle for inter-vehicle charging does not have to be transmitted in P320. Also, when the congestion degree in charging station 200 is low, charging can be performed in charging station 200. Accordingly, the processes subsequent to that in P120 are not performed in each element.

By performing the process according to the above-described sequence, even when congestion occurs in the charging station, inter-vehicle charging is performed between two vehicles that aim at the same destination, with the result that the opportunity to charge a vehicle during a stay at the destination can be secured. Furthermore, when the parking location is secured in advance in the parking area at the destination, inter-vehicle charging can be started in a short waiting time when the vehicle arrives at the destination.

Although not shown in FIG. 8, in vehicle 100A, when a candidate vehicle is not selected, the subsequent sequence is skipped. Also in vehicle 100B, when pairing is rejected, in order to facilitate selection of another candidate vehicle, management server 300 may re-transmit, to vehicle 100A, the information excluding the information about vehicle 100B from the information about the candidate vehicles.

Figure 10:
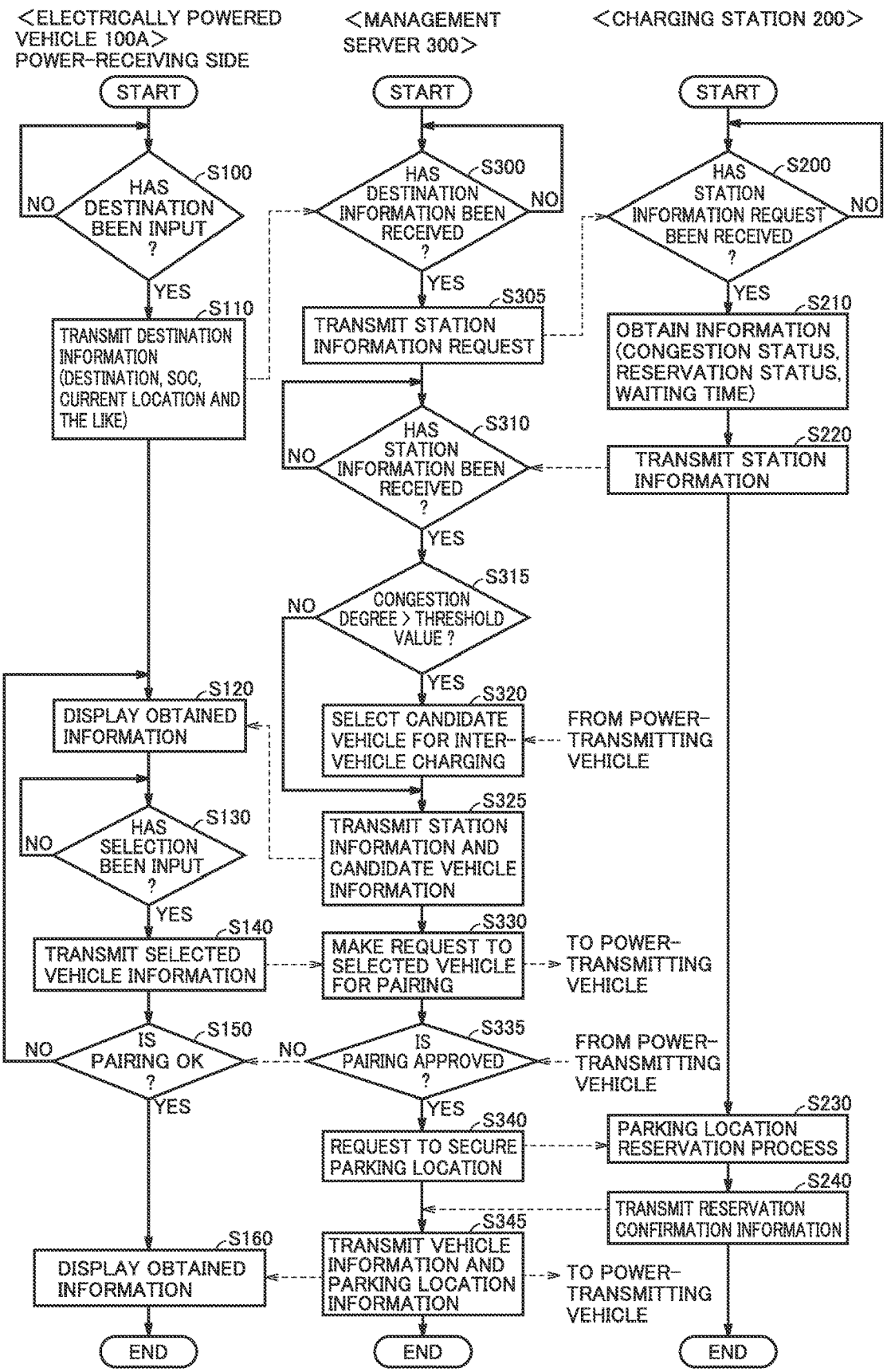
FIG. 10 is a flowchart for illustrating details of control performed in the information providing system according to the first embodiment.

FIG. 10 is a flowchart for illustrating the details of the processes performed in power-receiving vehicle 100A, charging station 200 and management server 300. The process in each flowchart is performed in vehicle ECU 150 in vehicle 100A, in integrated control unit 210 in charging station 200, and in control unit 310 in management server 300.

Referring to FIG. 10, the process in vehicle 100A will be hereinafter described. Vehicle 100 determines in step (which will be hereinafter abbreviated as S) 100 whether or not the destination has been input by the user and whether or not the charging request has been input by the user at the destination. When there is no input from the user (NO in S100), the process is returned to wait for an input by the user.

When there is an input by the user (YES in S100), the process proceeds to S110, in which vehicle 100 transmits the destination information to management server 300. The destination information includes the destination that has been input, the SOC, the current location, the expected arrival time, the charging request information, and the like, as described above.

When vehicle 100A obtains the information about charging station 200 and the information about the pairing candidate vehicle for inter-vehicle charging from management server 300 in association with the destination information transmitted from vehicle 100, vehicle 100A displays the obtained information on the screen of navigation device 170 (S120) as shown in FIG. 9. Then, vehicle 100 determines in S130 whether one of the displayed candidate vehicles for pairing has been selected or not by the user. When there is no selection input by the user (NO in S130), vehicle 100A returns the process to S130 and waits for a selection input by the user. Although not shown in FIG. 10, when there is no selection input by the user for a prescribed time period (for example, 10 minutes), or when the screen is changed to another screen in the state where there is no selection input, the standby process in S130 is interrupted to end the process.

When there is a selection input by the user (YES in S130), the process proceeds to S140, in which vehicle 100 transmits the information for specifying the selected candidate vehicle to management server 300. Then, when management server 300 indicates that inter-vehicle charging is approved in the result showing whether to approve pairing or not, which is transmitted from the selected candidate vehicle (YES in S150), vehicle 100 subsequently receives the detailed information about the power-transmitting vehicle and the information about the parking location that are transmitted from management server 300, and then displays the obtained information on navigation device 170 (S160). Then, the process ends.

On the other hand, when inter-vehicle charging is not approved in the result showing whether to approve pairing or not, which is transmitted from the selected candidate vehicle (NO in S150), the process is returned to S120. Then, vehicle 100A causes navigation device 170 to again display the information about candidate vehicles from which the information about the candidate vehicle having rejected pairing has been removed, so as to facilitate the user to select another candidate vehicle. Then, the processes from S120 to S150 are repeated until pairing with a candidate vehicle is completed. When there is no candidate vehicle for inter-vehicle charging, vehicle 100A displays the state of charging station 200, and then ends the process.

In the following, the process in management server 300 will be described. Management server 300 determines in S300 whether or not the destination information has been received from vehicle 100. When the destination information has not been received (NO in S300), the process is returned and management server 300 waits for reception of the destination information from vehicle 100.

When the destination information has been received (YES in S300), the process proceeds to S305. Then, based on the obtained destination information and the map information stored in storage unit 320 (FIG. 5), management server 300 transmits a transmission request for the station information to charging station 200 installed as an annex at the destination.

Management server 300 determines in S310 whether the station information has been received or not from selected charging station 200. When the station information has not yet been received from charging station 200 (NO in S310), the process is returned to S310 to wait until completion of reception of the station information from charging station 200.

On the other hand, when the station information has been received from the selected charging station 200 (YES in S310), the process proceeds to S315. In S315, management server 300 calculates the congestion degree based on the current utilization status, the reservation status, the waiting time, and the like about charging station 200 that have been received, to determine whether or not the congestion degree exceeds a prescribed threshold value.

When the congestion degree exceeds the threshold value (YES in S315), charging station 200 cannot be utilized due to congestion. Thus, from among other vehicles, management server 300 selects, as candidate vehicles, vehicles that are staying or scheduled to stay at the same destination and that permit inter-vehicle charging (S320). As to the vehicle information used for selecting candidate vehicles, the destination information stored in storage unit 320 and having been transmitted in advance from each vehicle may be used, or information may be newly collected when candidate vehicles need to be selected in S315. When candidate vehicles have been selected, in S325, management server 300 transmits, to vehicle 100A, the information showing the congestion status in charging station 200 and the information about the candidate vehicles for inter-vehicle charging.

When the congestion degree is equal to or less than a threshold value (NO in S315), S320 is skipped and the process proceeds to S325. Then, management server 300 transmits the information about the congestion status in charging station 200 to vehicle 100A. In addition, when the congestion degree is equal to or less than a threshold value, basically, charging can be performed in charging station 200, so that vehicle 100A is not notified about candidate vehicles for inter-vehicle charging. Thus, although not clearly shown in FIG. 10, the processes subsequent to that in step S330 are not performed.

In the case where the congestion degree exceeds a threshold value, after S325, when management server 300 receives the information for specifying the vehicle with which inter-vehicle charging is desired from vehicle 100A, then, management server 300 notifies the selected candidate vehicle that it has been selected as a candidate for inter-vehicle charging, and also transmits, to the selected candidate vehicle, the information for checking whether to approve inter-vehicle charging with vehicle 100A or not (pairing request information) (S330).

In S335, management server 300 receives a response to the pairing request information from the selected candidate vehicle. When pairing is not approved (NO in S335), management server 300 notifies vehicle 100A that pairing is not approved. When pairing is approved (YES in S335), the process proceeds to S340. Then, management server 300 transmits, to charging station 200, the information for requesting to secure the parking location where inter-vehicle charging is performed.

Then, when management server 300 receives, from charging station 200, the confirmation information showing that the parking location has been reserved, this management server 300 notifies vehicle 100A and the selected candidate vehicle about each other's detailed vehicle information, and also transmits the information about the parking location for performing inter-vehicle charging to vehicle 100A and the selected candidate vehicle (S345).

Then, the process in charging station 200 will be hereinafter described. Charging station 200 determines in S200 whether or not the transmission request for the station information has been received from management server 300. When the transmission request has not been received (NO in S200), the process is returned and charging station 200 waits for reception of the transmission request from management server 300.

When the transmission request has been received (YES in S200), the process proceeds to S210. Then, charging station 200 obtains information including the congestion status, the reservation status, the waiting time, and the like in charging station 200 itself. Then, charging station 200 transmits the obtained station information to management server 300 (S220).

Then, when the user selects the candidate vehicle for inter-vehicle charging and receives the reservation request information about the parking location used for inter-vehicle charging from management server 300, charging station 200 performs a parking location reservation process in S230. When utilization reservation is completed, charging station 200 transmits, to management server 300, the reservation confirmation information showing that reservation has been normally completed (S240). Then, the process ends.

Although not shown in FIG. 10, when the reservation request information about the parking location is not received from management server 300 even after a prescribed time period (for example, 15 minutes) has elapsed since the station information was transmitted to management server 300 in S220, charging station 200 skips the processes in S230 and S240 and ends the process.

By controlling vehicle 100A, charging station 200 and management server 300 according to the processes as described above, in the case where the user cannot perform charging of vehicle 100A in the charging station installed as an annex at the destination due to congestion, management server 300 notifies the user of vehicle 100A about the information of the vehicle candidate with which inter-vehicle charging can be performed at the destination. Then, in accordance with selection of the candidate vehicle by the user, pairing with the candidate vehicle is implemented by management server 300. Thereby, even when congestion occurs in charging station 200 at the destination, it becomes possible to ensure the opportunity to charge vehicle 100A using the electric power from the candidate vehicle during a stay at the destination.

Second Embodiment

The first embodiment has been described with reference to an example in which a parking space for performing inter-vehicle charging is secured in the parking area at the destination when pairing with the candidate vehicle is completed. However, when heavy congestion occurs at the destination, there may be a case where it becomes difficult to secure the space where inter-vehicle charging is performed in the parking area at the destination.

In the second embodiment, an explanation will be hereinafter given with regard to an example in which, when the parking space for inter-vehicle charging cannot be secured at the destination as described above, for example, both vehicles are guided to another parking area or the like in the vicinity of the destination.

Figure 11:
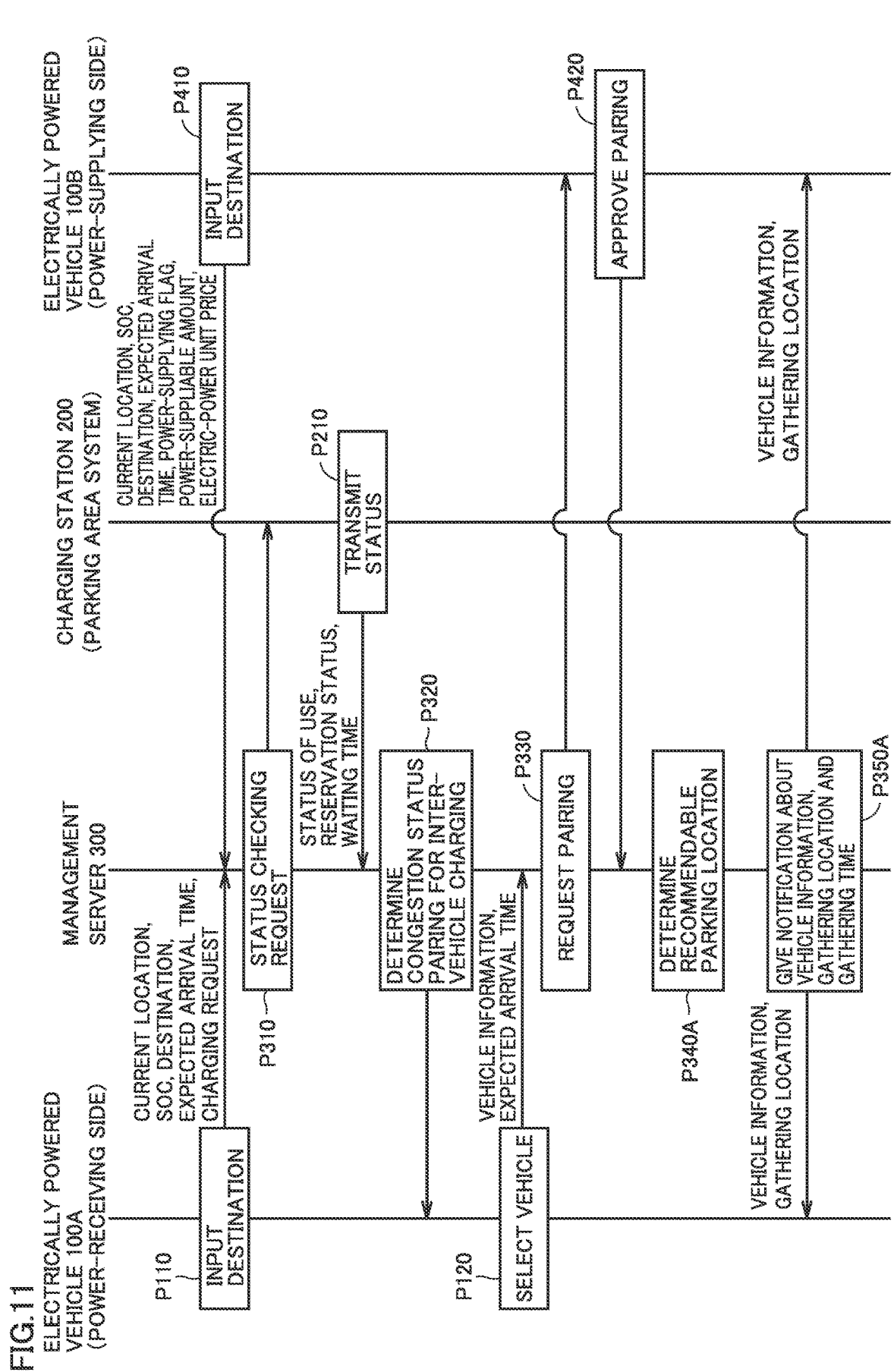
FIG. 11 is a sequence diagram showing a process performed in each element of an information providing system according to the second embodiment.

FIG. 11 is a sequence diagram showing a process performed in each element in an information providing system 10 according to the second embodiment. In FIG. 11, each of elements in processes subsequent to P340 in the sequence diagram in the first embodiment shown in FIG. 8 is replaced. The description about the same elements as those in FIG. 8 will not be repeated in FIG. 11.

Referring to FIG. 11, when management server 300 receives the information showing approval of pairing from power-supplying vehicle 100B, management server 300 determines based on the congestion status in charging station 200 whether or not the parking space for performing inter-vehicle charging can be secured at the destination. When it is difficult to secure the parking space, management server 300 searches the parking area and the like in the vicinity of the destination for a recommendable parking location where a parking space for performing inter-vehicle charging can be secured (P340A). Then, management server 300 notifies vehicle 100A and vehicle 100B about each other's detailed vehicle information and the information about the recommendable parking location for performing inter-vehicle charging in a neighboring parking area and the like that have been searched (a gathering location, a gathering time) (P350A).

Although not shown in FIG. 11, the users of vehicle 100A and vehicle 100B may be inquired whether to utilize the recommendable parking space that has been searched for by management server 300. When one of the users does not like the parking space recommended by management server 300, the information about another candidate parking space may be provided, or pairing may be cancelled to newly make pairing with another candidate vehicle.

Figure 12:
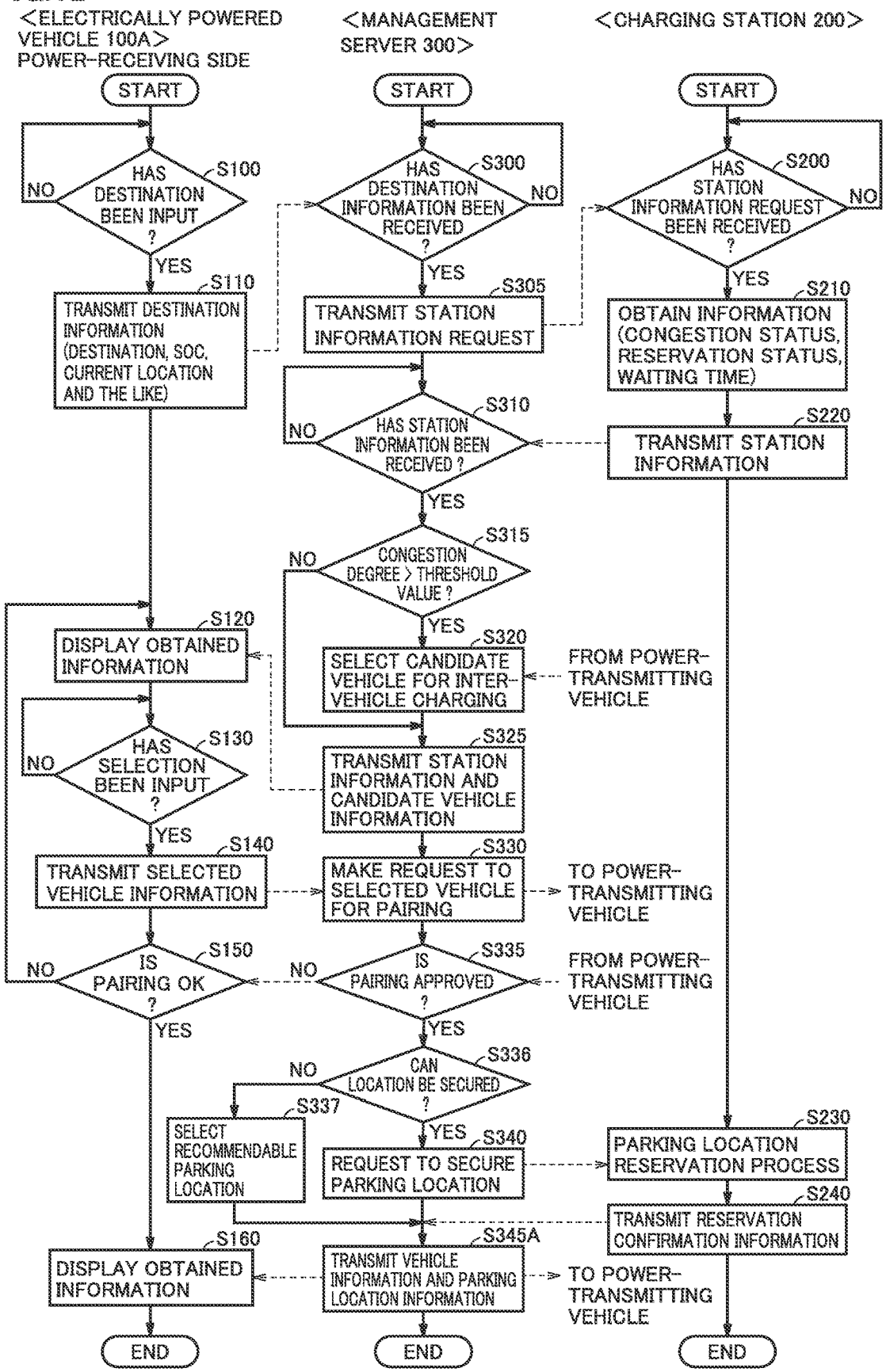
FIG. 12 is a flowchart for illustrating details of control performed in the information providing system according to the second embodiment.

FIG. 12 is a flowchart for illustrating details of control performed in information providing system 10 according to the second embodiment. In FIG. 12, steps S336 and S337 are added to the flowchart in the first embodiment shown in FIGS. 10, and S345 is replaced with S345A in this flowchart. The detailed description of the same steps as those in FIG. 10 will not be repeated in FIG. 12.

Referring to FIG. 12, when management server 300 receives a notification about approval of pairing from a candidate vehicle in S335 (YES in S335), the process proceeds to S336. Then, management server 300 determines based on the already obtained information about charging station 200 whether or not the parking space for performing inter-vehicle charging can be secured at the destination.

When the parking space cannot be secured at the destination (NO in S336), the process proceeds to S337. Then, from among the parking areas in the vicinity of the destination, management server 300 selects a recommendable parking area (charging execution location) where a parking space for performing inter-vehicle charging can be secured. Then, in S345A, management server 300 notifies both vehicles about the location information of the selected parking area together with each other's detailed vehicle information. In addition, when the parking space can be secured at the destination (YES in S336), the process proceeds to S340, and thereafter, the same processes as those in the first embodiment are performed.

By performing control according to the processes as described above, even when a parking space for performing inter-vehicle charging cannot be secured at the destination, inter-vehicle charging can be performed in the vicinity of the destination.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A server configured to communicate with
   a plurality of vehicles each equipped with a power storage device and
   a charging station configured to supply electric power, each of the plurality of vehicles being configured to
   allow charging of the power storage device using electric power from the charging station, and
   perform inter-vehicle charging for charging another vehicle using electric power of the power storage device,
   the server being configured to
   obtain a congestion degree in the charging station based on information from the charging station,
   obtain a destination of each of the plurality of vehicles,
   when the charging station is installed as an annex at a destination of a first vehicle included in the plurality of vehicles, and when the congestion degree in the charging station exceeds a threshold value, select at least one of candidate vehicles each permitting the inter-vehicle charging from among vehicles that are included in the plurality of vehicles and that aim at a destination identical to the destination of the first vehicle, and
   transmit, to the first vehicle, information about each of the candidate vehicles selected.

2. The server according to claim 1, wherein
   the first vehicle is configured to, when a user selects from among the candidate vehicles a second vehicle with which the inter-vehicle charging is desired, transmit, to the server, information for specifying the second vehicle selected, and
   the server is configured to make pairing between the first vehicle and the second vehicle.

3. The server according to claim 2, wherein
   the server is configured to, when pairing between the first vehicle and the second vehicle completes, transmit reservation request information for securing a charging execution location for the inter-vehicle charging to the charging station, and
   the charging station is configured to secure the charging execution location in accordance with the reservation request information.

4. The server according to claim 2, wherein
   the server is configured to
   when pairing between the first vehicle and the second vehicle completes, determine a charging execution location for the inter-vehicle charging based on location information about each of the first vehicle and the second vehicle, and
   transmit location information about the charging execution location to the first vehicle and the second vehicle.

5. The server according to claim 1, wherein the information about each of the candidate vehicles includes at least one of a power-suppliable amount, an available time, and an electric-power unit price about each of the candidate vehicles.

6. An information providing system comprising:
   a plurality of vehicles each equipped with a power storage device;
   a charging station configured to supply electric power; and
   a server configured to communicate with the plurality of vehicles and the charging station,
   each of the plurality of vehicles being configured to
   allow charging of the power storage device using electric power from the charging station, and
   perform inter-vehicle charging for charging another vehicle using electric power of the power storage device,
   the server being configured to
   obtain a congestion degree in the charging station based on information from the charging station, obtain a destination of each of the plurality of vehicles, when the charging station is installed as an annex at a destination of a first vehicle included in the plurality of vehicles, and when the congestion degree in the charging station exceeds a threshold value, select at least one of candidate vehicles each permitting the inter-vehicle charging from among vehicles that are included in the plurality of vehicles and that aim at a destination identical to the destination of the first vehicle, and transmit, to the first vehicle, information about each of the candidate vehicles selected, the first vehicle being configured to display, to a user, information about each of the candidate vehicles from the server.

7. A method of providing information to a vehicle equipped with a power storage device, the vehicle being configured to communicate with
- a charging station configured to supply electric power and
- a server, the vehicle being configured to
- allow charging of the power storage device using electric power from the charging station, and
- perform inter-vehicle charging for charging another vehicle using electric power of the power storage device, the method comprising:
- obtaining, by the server, a congestion degree in the charging station based on information from the charging station;
- obtaining, by the server, a destination of the vehicle;
- when the charging station is installed as an annex at the destination of the vehicle, and when the congestion degree in the charging station exceeds a threshold value, selecting, by the server, a candidate vehicle permitting the inter-vehicle charging from among other vehicles that aim at a destination identical to the destination of the vehicle;
- transmitting, from the server to the vehicle, information about the candidate vehicle selected; and
- displaying, in the vehicle, information about the candidate vehicle.

* * * * *